(12) United States Patent
Dolejs, III

(10) Patent No.: US 10,866,077 B1
(45) Date of Patent: Dec. 15, 2020

(54) ADJUSTABLE MEASURING TOOL AND METHOD OF USE

(71) Applicant: Charles E. Dolejs, III, Tulsa, OK (US)

(72) Inventor: Charles E. Dolejs, III, Tulsa, OK (US)

( * ) Notice: Subject to any disclaimer, the term of this patent is extended or adjusted under 35 U.S.C. 154(b) by 328 days.

(21) Appl. No.: 15/929,010

(22) Filed: Apr. 27, 2018

Related U.S. Application Data

(60) Provisional application No. 62/490,978, filed on Apr. 27, 2017.

(51) Int. Cl.
*G01B 3/08* (2006.01)
*G01B 3/00* (2006.01)

(52) U.S. Cl.
CPC .............. *G01B 3/08* (2013.01); *G01B 3/002* (2013.01)

(58) Field of Classification Search
CPC .......... G01B 3/08; G01B 3/1041; G01B 3/02; G01B 3/1084; G01B 2003/1064; G01B 3/06; G01B 3/1043; G01B 3/1046
USPC .................................................. 33/503, 32.3
See application file for complete search history.

(56) References Cited

U.S. PATENT DOCUMENTS

| | | | | |
|---|---|---|---|---|
| 2,356,544 A * | 8/1944 | Swanson | ................... | G01B 3/08 33/809 |
| 3,003,244 A * | 10/1961 | Fogliano | ................... | G01B 3/56 33/341 |
| 3,492,737 A * | 2/1970 | Swanson | ................... | G01B 3/08 33/809 |
| 4,180,914 A * | 1/1980 | Lechner | ................... | G01B 3/08 33/809 |
| 4,336,655 A * | 6/1982 | Thingstad | ................ | G01B 3/08 33/809 |
| 4,438,538 A * | 3/1984 | Larsen | ..................... | B44D 3/38 7/164 |
| 4,662,077 A * | 5/1987 | Richardson | .............. | G01B 3/08 33/296 |
| 5,430,952 A * | 7/1995 | Betts | .................... | G01B 3/1084 33/760 |
| 6,293,177 B1 * | 9/2001 | MacKenzie | ............ | B23Q 3/007 83/467.1 |
| 6,418,631 B1 * | 7/2002 | Ramsthaler | ............ | B43K 23/00 33/41.4 |
| 10,495,434 B1 * | 12/2019 | Motz | ..................... | G01B 3/1084 |
| 2001/0042315 A1 * | 11/2001 | Dixon | ...................... | B25H 7/04 33/758 |
| 2007/0101600 A1 * | 5/2007 | Alders | ................. | G01B 3/1084 33/760 |

(Continued)

*Primary Examiner* — Yaritza Guadalupe-McCall
(74) *Attorney, Agent, or Firm* — Kintner IP LLC; Mary Frances Ludwig

(57) ABSTRACT

An adjustable measuring tool includes an elongated tool body and an extensible portion slidably positionable within the tool body and extensible through an open end. A thin tab extends downwardly from a front body face and has flat front and rear surfaces for alignment with edges of materials to be measured or marked. In embodiments, a backset gauge extends forwardly from the tool body, for measuring or marking backsets such as for grout or mortar. The extensible portion, tool body, or backset gauge may include measuring indicia. Another embodiment includes an adjustable angle attachment having two arms continuously rotatable about a central pivot point, for precisely measuring angles or squaring the tool to an angled surface.

14 Claims, 10 Drawing Sheets

(56) References Cited

U.S. PATENT DOCUMENTS

| | | | | |
|---|---|---|---|---|
| 2007/0234483 A1* | 10/2007 | Kunz | ............... | G01C 9/28 |
| | | | | 7/143 |
| 2008/0256816 A1* | 10/2008 | Cosentino | ............... | B26B 5/001 |
| | | | | 33/760 |
| 2009/0090016 A1* | 4/2009 | Roach | ............... | G01B 3/1003 |
| | | | | 33/770 |
| 2009/0271999 A1* | 11/2009 | Alker | ............... | G01B 3/1084 |
| | | | | 33/762 |
| 2010/0088915 A1* | 4/2010 | Neff | ............... | G01B 3/1084 |
| | | | | 33/759 |
| 2013/0133214 A1* | 5/2013 | Steffensen | ............... | G01C 9/02 |
| | | | | 33/296 |

* cited by examiner

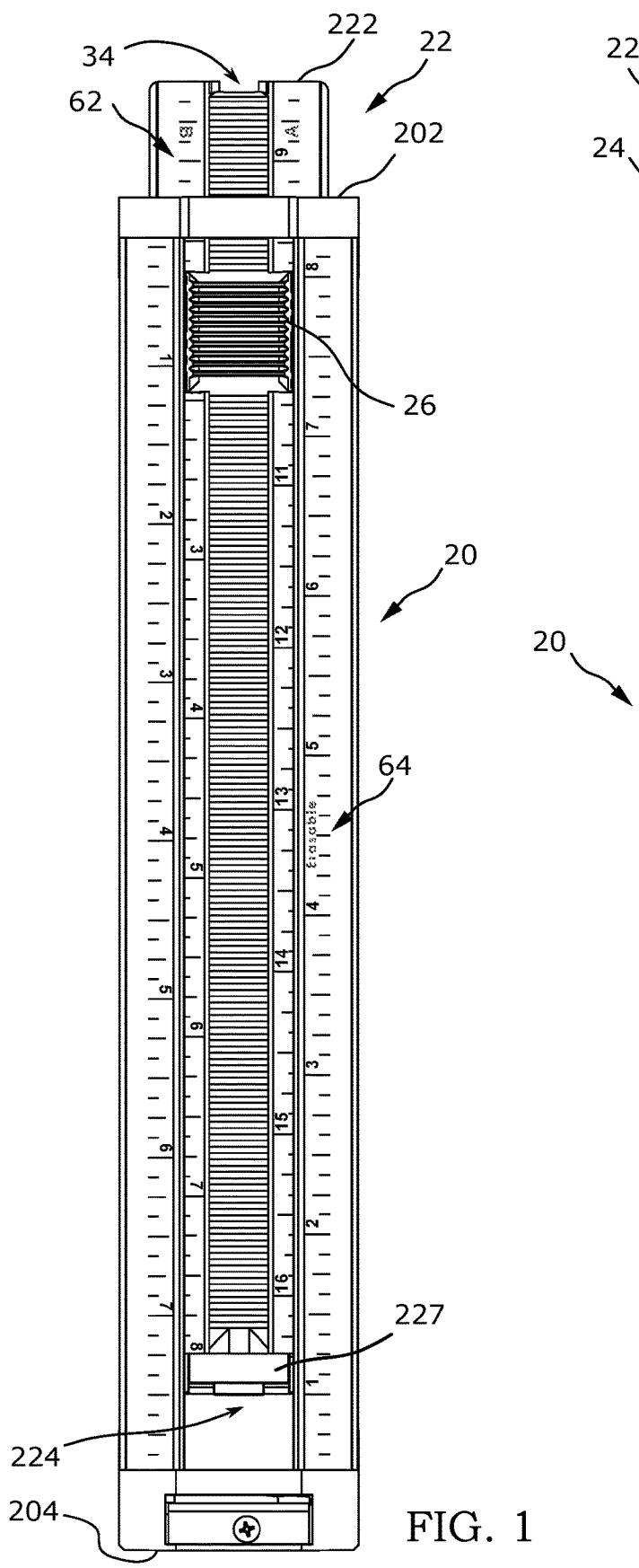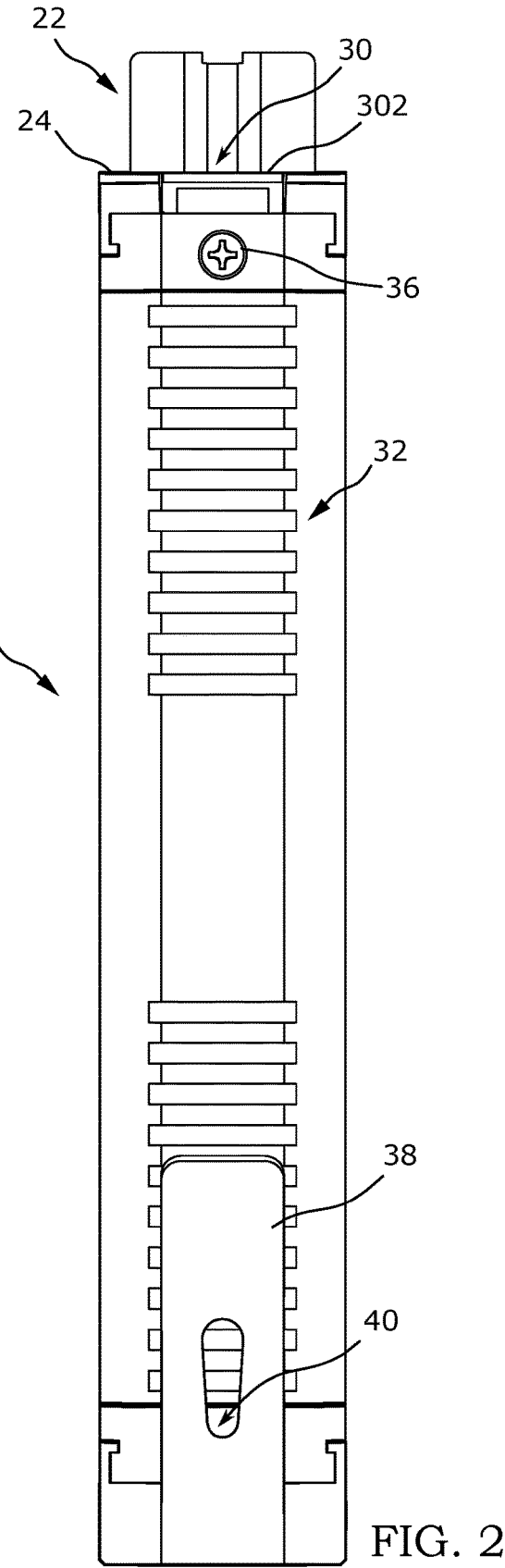
FIG. 1                     FIG. 2

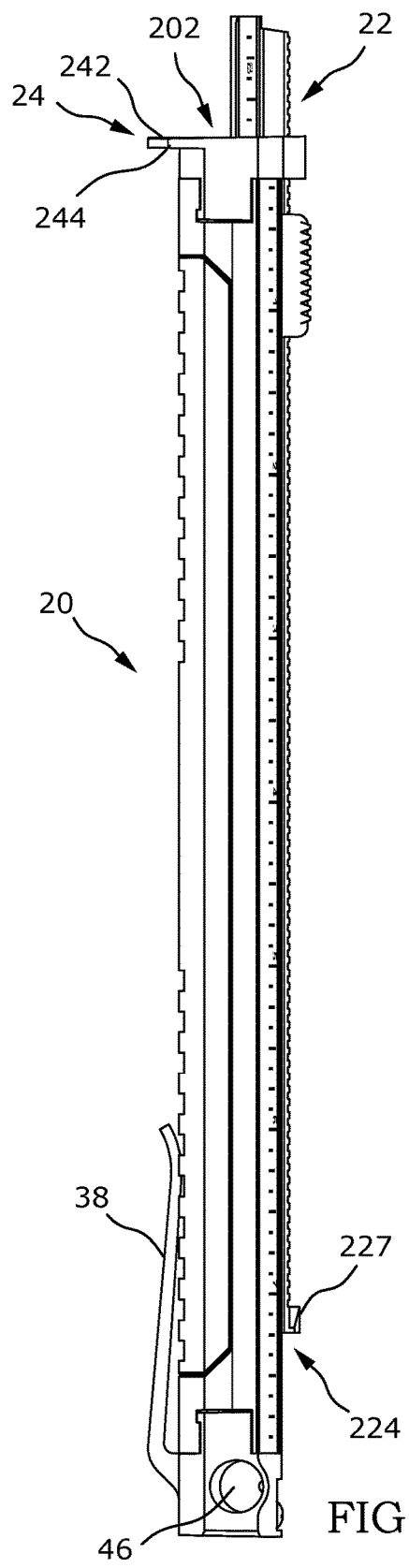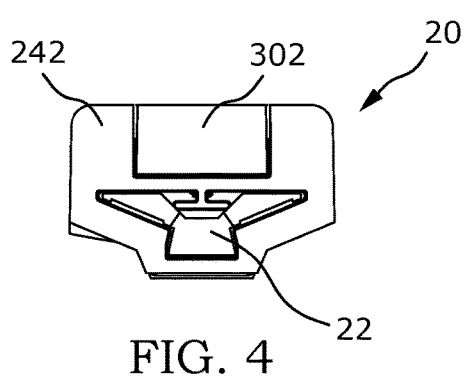
FIG. 4
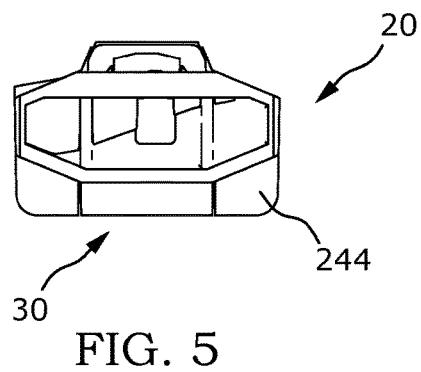
FIG. 5
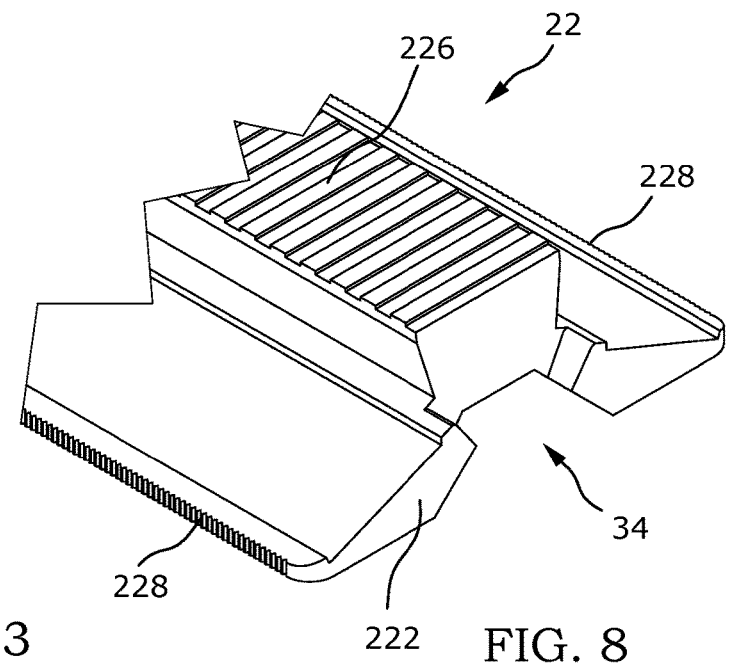
FIG. 3
FIG. 8

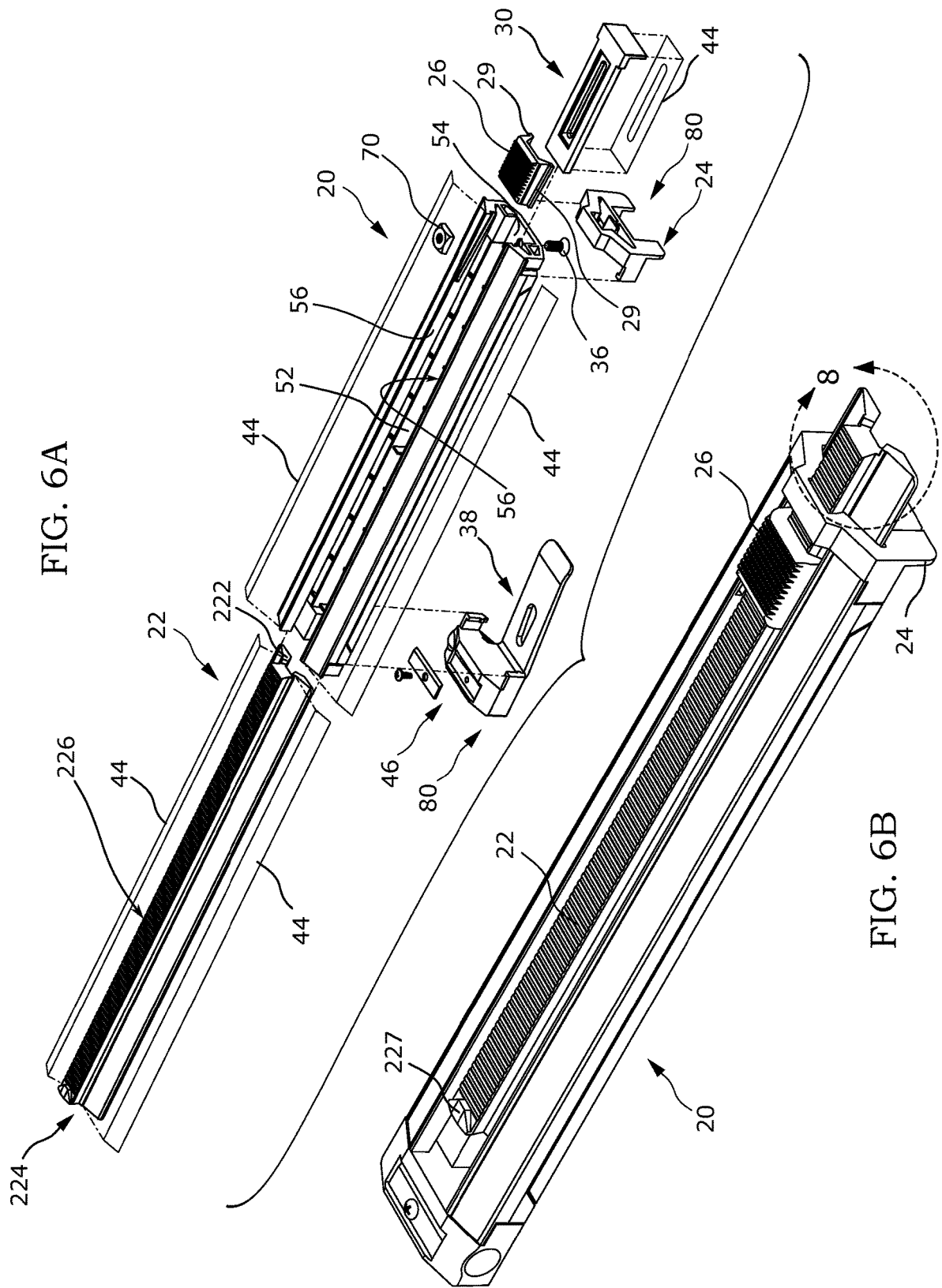

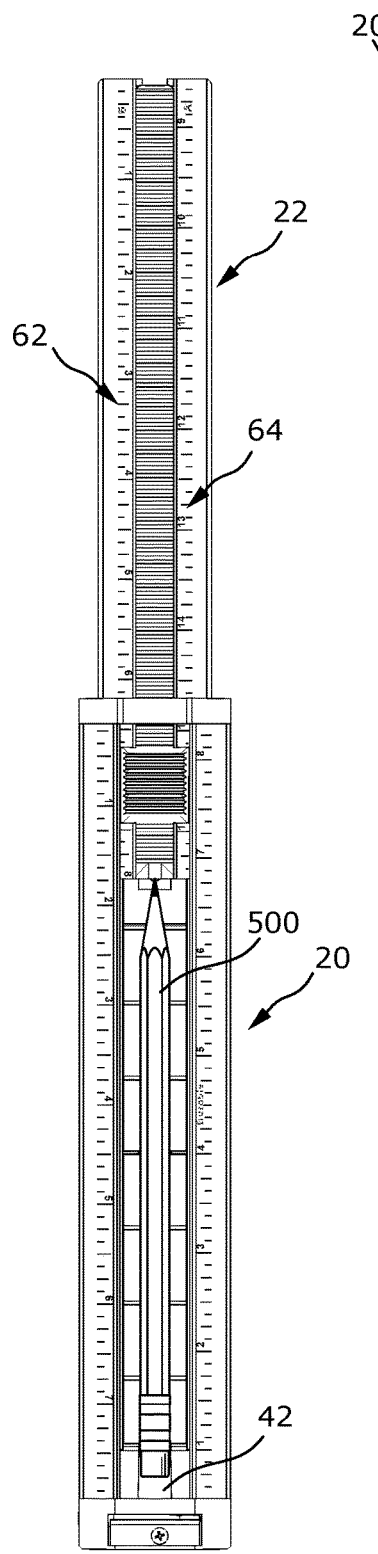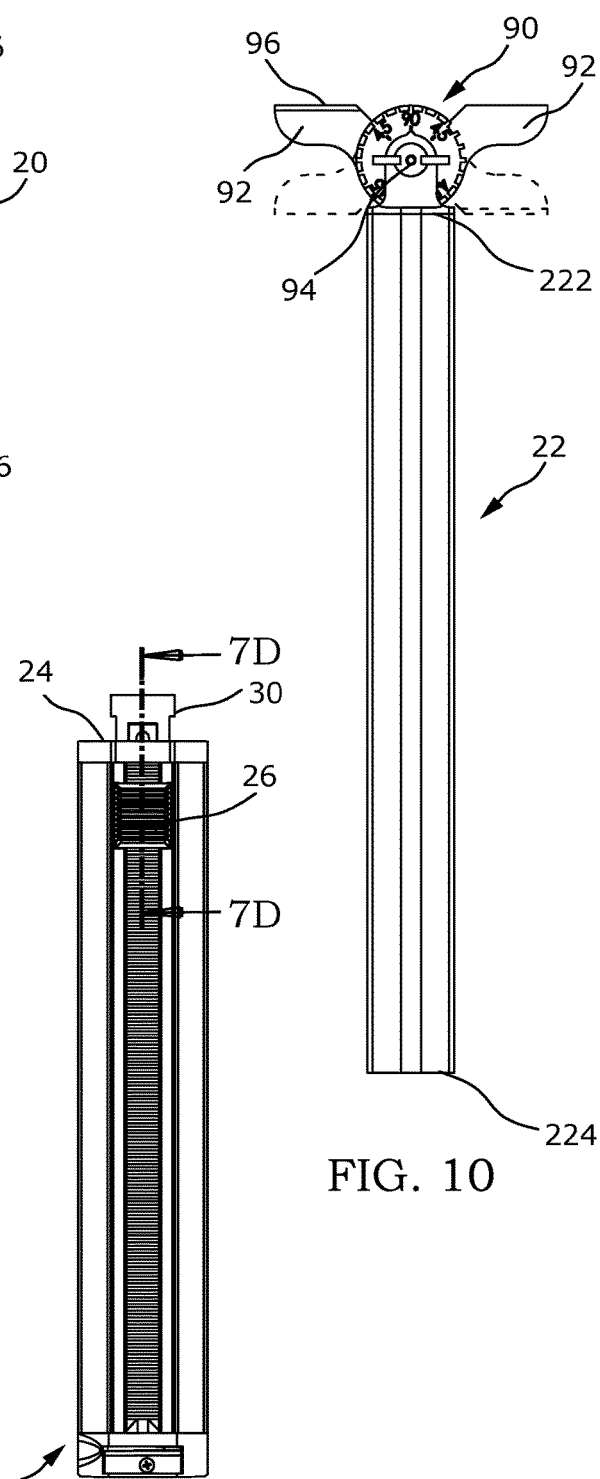
FIG. 7A  FIG. 7B  FIG. 7C  FIG. 10

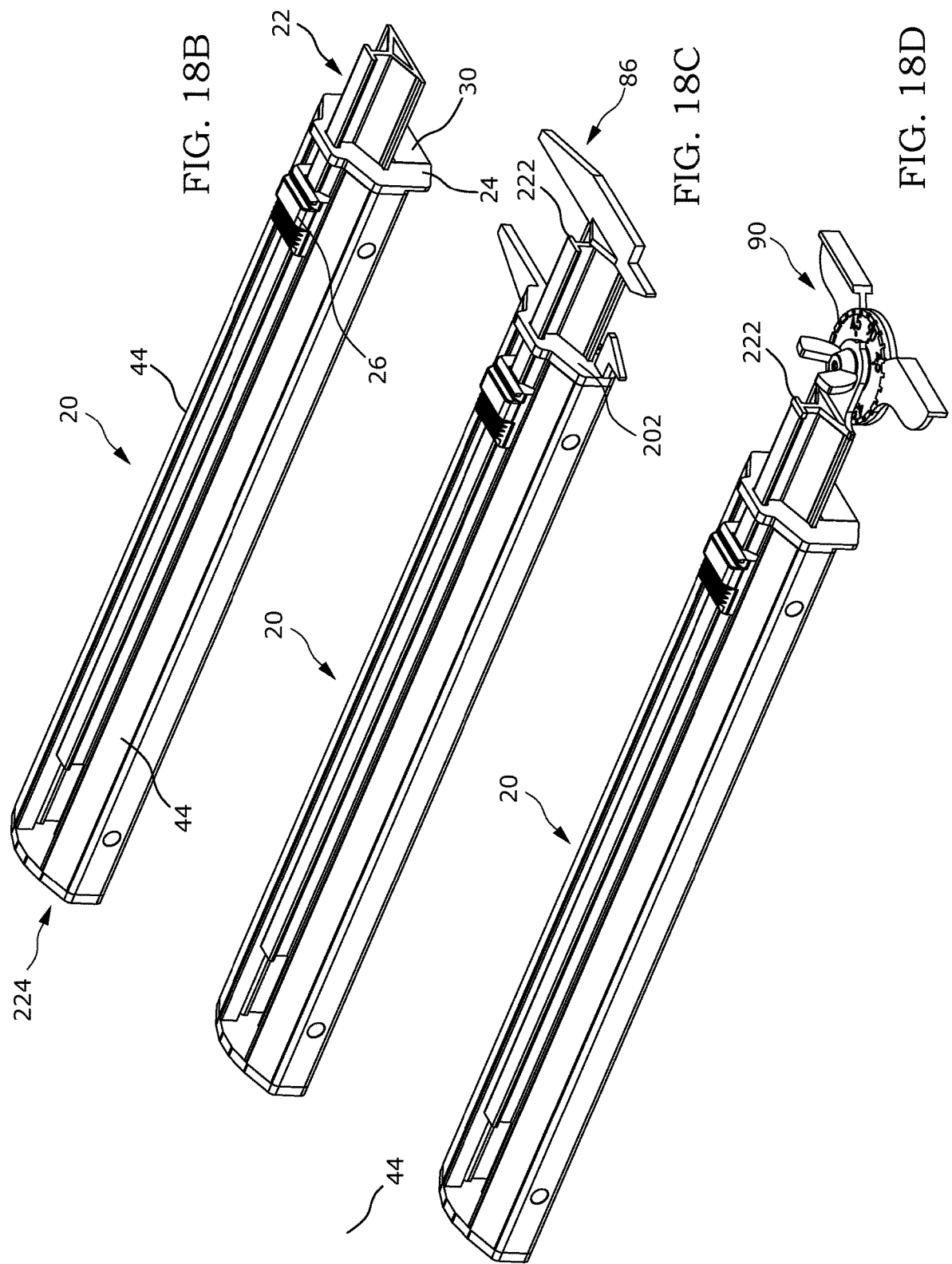

ADJUSTABLE MEASURING TOOL AND METHOD OF USE

CROSS REFERENCE TO RELATED APPLICATION

This application claims the filing benefit under 35 U.S.C. § 119(e) of U.S. Provisional Application No. 62/490,978, filed Apr. 27, 2017, which is hereby incorporated by reference.

TECHNICAL FIELD

The present invention pertains generally to measuring devices, and more particularly to an adjustable measuring tool with an extensible portion.

BACKGROUND OF THE INVENTION

Transferring measurements to material for cutting using a square and tape measure is slow and fatiguing, often resulting in mistakes that cost time and material. Measurement offsets for grout or joints are often applied mentally, introducing another opportunity for error.

There are also instances where capturing precise distances and angles simultaneously is required. For example, when replacing flooring removing the baseboards is not always practical due to the cost of reinstalling and painting. Tightly fitting flooring materials against the baseboard requires a precise measuring of both distances and angles.

There therefore is a need in the art for a measuring tool which simplifies and speeds up the measuring process while increasing accuracy and repeatability. The ability to measure backsets, incorporate offsets when marking measurements, and precisely measure and mark angles are also highly desirable features.

BRIEF SUMMARY OF THE INVENTION

The present invention is directed to an adjustable measuring tool which allows fast and easy transfer of measurements. The measuring tool eliminates the need to read and remember measurements, and eliminates several steps from the conventional measuring and marking process. The tool is especially useful when measurements are required for cutting wood flooring, ceramic tile, metal working, cabinet making, brick and block, plumbing pipes, electrical boxes, and a variety of other applications.

In an embodiment, an adjustable measuring tool comprises an elongated tool body having a longitudinal channel defined therethrough. The channel is shaped and dimensioned to receive an extensible portion. The channel has an open end coincident with a front body face of the tool body, and the extensible portion is slidably positionable within the channel and extensible through the open end. The tool further comprises a thin tab extending downwardly from the front body face and having a substantially flat front tab surface and a substantially flat rear tab surface. The extensible portion has a front end, a rear end, a top face, and a first set of measuring indicia longitudinally spaced on the top face and oriented substantially parallel to the front body face, wherein the front end is a zero point for the first set of measuring indicia.

In another embodiment, the measuring tool includes a backset gauge forwardly extensible from the tool body, adjustably positionable between a recessed position and a fully extended position, and having a substantially flat front gauge face configured to not extend forward of the front body face when the backset gauge is in the recessed position.

In another embodiment, the backset gauge is configured to be locked in an extended position. In yet another embodiment, the backset gauge is extensible forward of the front body face by at least 25 mm.

In another embodiment, the backset gauge has a set of longitudinally spaced backset measuring indicia oriented substantially parallel to the front body face, wherein the front gauge face is a zero point for the backset measuring indicia.

In another embodiment, a cross-section of the extensible portion adjacent the rear end is larger than the open end of the channel, thereby restricting motion of the extensible portion through the open end.

In another embodiment, the longitudinal channel has two sidewalls, each sidewall having a groove angled downwardly toward the front body face. A lock has a bottom lock face and two feet, and each foot is slidably positionable within one of the grooves. The bottom lock face is configured to contact the extensible portion when the feet are slid downwardly within the grooves, thereby restricting motion of the extensible portion within the channel.

In another embodiment, a second set of measuring indicia is longitudinally spaced over the tool body and the extensible portion, the indicia oriented substantially parallel to the front body face, and wherein a rear body face of the tool body is a zero point for the second set of measuring indicia.

In another embodiment, the measuring tool includes a label having an erasable writing surface, and the label extends longitudinally along one of the tool body or the extensible portion.

In another embodiment, the measuring tool cooperates with a writing instrument having a tip, and the measuring tool includes a recess over a portion of the front end of the extensible portion, the recess configured to receive the tip of the writing instrument.

In another embodiment, the measuring tool cooperates with a writing instrument, and the tool body of the measuring tool includes a compartment shaped and dimensioned to receive the writing instrument.

In another embodiment, the extensible portion has longitudinal edges, and the longitudinal edges have a grooved surface.

In another embodiment, the measuring tool includes an adjustable angle attachment configured for connection to the front end of the extensible portion. The adjustable angle attachment has two arms continuously rotatable about a central pivot point, each arm having a substantially flat face.

Other embodiments, in addition to the embodiments enumerated above, will become apparent from the following detailed description, taken in conjunction with the accompanying drawings, which illustrate, by way of example, the principles of the adjustable measuring tool and methods of use.

BRIEF DESCRIPTION OF THE DRAWINGS

FIG. 1 is a top plan view of an adjustable measuring tool.
FIG. 2 is a bottom plan view of the tool.
FIG. 3 is a left side view of the tool, the right side being substantially a mirror image.
FIG. 4 is a front view of the tool.
FIG. 5 is a rear view of the tool.
FIG. 6A is a reduced exploded perspective view of the tool and FIG. 6B is a reduced perspective view of the tool.

FIGS. 7A, 7B, 7C are reduced top plan views of the tool in an extended position, a collapsed position, and a backset extended position, respectively.

FIG. 8 is an enlarged view of region 8 of FIG. 6B.

FIG. 10 is a top plan view of an embodiment of an extensible portion of the tool.

Figure 7D:
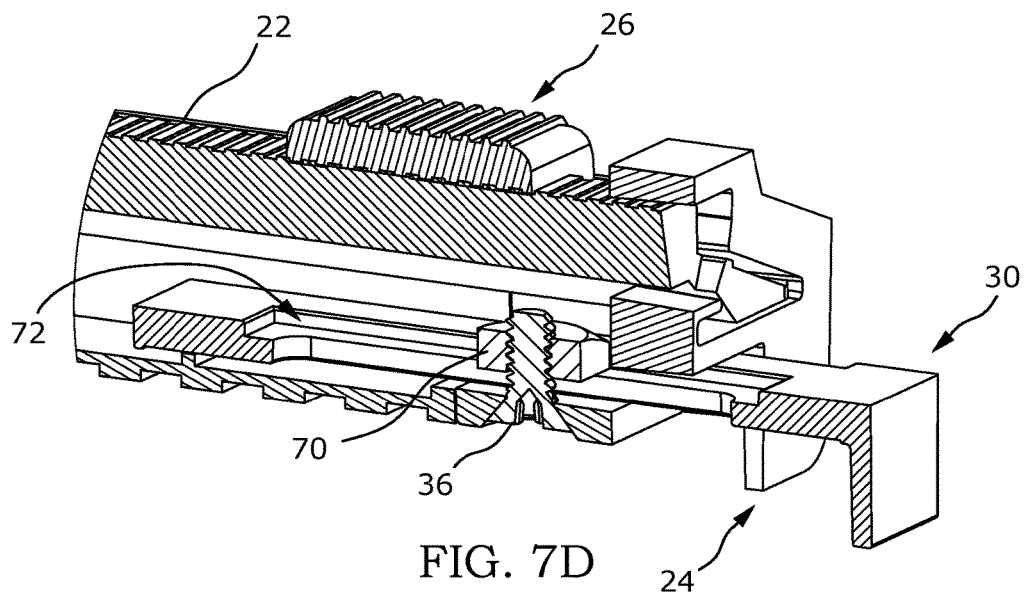
FIGS. 7D & 7E are rotated enlarged cross-sectional views along line 7D-7D of FIG. 7C, showing alternate positions of a backset gauge.

LIST OF DRAWING REFERENCE NUMERALS 20 tool body
22 extensible portion
24 tab
26 lock
28 bottom lock face
29 foot
30 backset gauge
32 grip
34 recess
36 screw
38 clip
40 aperture
42 compartment
44 label
46 pencil sharpener
52 channel
54 open end
56 sidewall
58 groove
62 first set of measuring indicia
64 second set of measuring indicia
66 backset measuring indicia
70 retainer
72 retainer groove
80 end piece
82 clasp
84 notch
86 caliper attachment
90 adjustable angle attachment
92 arm
94 pivot point
96 face
202 front tool body face
204 rear tool body face
222 front end
224 rear end
226 top face
227 stop
228 longitudinal edge
242 front tab surface
244 rear tab surface
302 front gauge face
500 writing utensil
502 tip
610 first material
610 first material edge
620 second material
622 second material
700 line
800 object

DETAILED DESCRIPTION OF THE INVENTION

Referring initially to FIGS. 1-5, there are illustrated, respectively, top and bottom plan, left side, front, and rear views of an adjustable measuring tool, also referred to generally herein as a ruler or a tool. FIG. 6A is a reduced exploded perspective view of the tool and FIG. 6B is a reduced perspective view of the tool. The measuring tool has an elongated tool body which is generally designated as 20. A longitudinal channel 52 (best seen in FIG. 7A) is defined through tool body 20, and is shaped and dimensioned to receive an extensible portion 22. Extensible portion 22 is positionable by sliding forwardly through an open end 54 of channel 52, open end 54 being coincident with a front body face 202 of tool body 20.

Extensible portion 22 has a front end 222, a rear end 224, and a top face 226, as shown in the exploded view of FIG. 6A. A first set of measuring indicia 62 is longitudinally spaced on top face 226 and oriented substantially parallel to front body face 202, as shown in FIG. 1. Front end 222 of extensible portion 22 is a zero point for first set of measuring indicia 62, which may extend along the entire extensible length of extensible portion 22.

A thin tab 24 extends downwardly from front body face 202, and is used for squaring the ruler to an edge of material to be marked with a measurement. Tab 24 has substantially flat front and rear tab surfaces 242, 244, which allow tab 24 to be positioned flush against a material surface for measuring or marking as described below. In embodiments, tab 24 is unitarily formed with tool body 20.

In an embodiment, the ruler includes a backset gauge 30, shown in FIG. 2 nested in tab 24. Backset gauge 30 extends forwardly from tool body 20, and may be used for offsetting measurements from a material edge, allowing the user to automatically subtract preset distances for grout and mortar joints, inlays, and a variety of other applications requiring backset measuring.

The position of backset gauge 30 is adjustable between a recessed position (see FIG. 2) and an extended position (see for example, FIGS. 7C & 7D). The extension length of backset gauge 30 may be continuously adjustable between recessed and fully extended positions, or may be adjustable in discrete increments, e.g. ¹⁄₁₆ inch increments. In embodiments, backset gauge 30 is extensible forward of front body face 202 by at least ¼", at least ½", at least ¾", at least 1", at least 6 mm, at least 12 mm, or at least 25 mm. The backset gauge may be locked into an extended or recessed position with, for example, a set screw 36, a series of grooves and interlocking fins, or similar retaining mechanism. Use of the backset gauge is further described in discussion of FIGS. 13A-C.

Figure 7E:
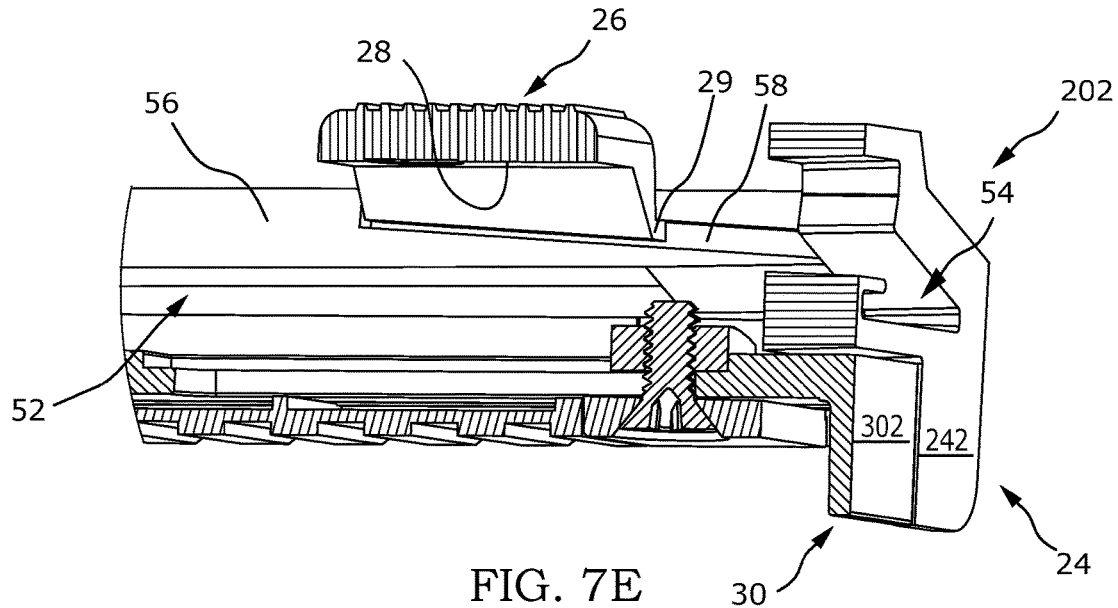

When backset gauge 30 is not in use it can be recessed inside of tool body 20, so that its front gauge face 302 does not extend forward of the front body face 202 of tool body 20 (see FIG. 7E). Thus, when in the recessed position, the backset gauge does not interfere with the normal measuring process. Front gauge face 302 is substantially flat for flush placement against surfaces to be marked or measured.

Figure 13A:
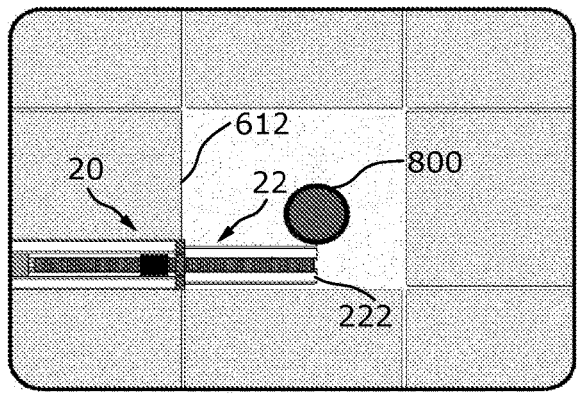
FIGS. 13A & 13B are views of the tool in use for measuring and marking centers, respectively.

Backset gauge 30 may have a set of longitudinally spaced backset measuring indicia 66 oriented substantially parallel to front body face 202 (see FIG. 13A). Front gauge face 302 may be a zero point for the distance indicated by backset measuring indicia 66.

In embodiments, extensible portion 22 may have a cross-section adjacent, nearby, or coincident with its rear end 224, where the cross-section is larger than open end 54 of channel 52. This enlarged cross-section restricts motion of extensible portion 22 through the open end, thereby preventing complete removal of extensible portion 22 by sliding forward out of tool body 20. The region of enlarged cross-section is also referred to herein as a stop 227, as shown in FIGS. 3 & 6B where the cross-section is enlarged with a projection upward from top face 226.

FIGS. 7A-7C are, respectively, reduced top plan views of the ruler in an extended position, in a collapsed position, and in a backset extended position. In the extended position of FIG. 7A, extensible portion 22 is slid forward from tool body 20 to a desired measurement distance. In the collapsed position of FIG. 7B, extensible portion 22 is positioned entirely within channel 52; in other words, no portion of extensible portion 22 is slid or extended forwardly from front body face 202 of tool body 20. In exemplary embodiments, the ruler may have a total length in the collapsed position of 6 inches, 1 foot, 1.5 feet, 2 feet, 3 feet, 0.5 meter, 1 meter, or 1 yard. In embodiments, the ruler may have a total length in a fully extended position of between about 75% and about 95% of the total length in the collapsed position. A fully extended position is when extensible portion 22 is slid forwardly from tool body 20 as far as possible without either removing extensible portion 22 completely from channel 52 or disassembling, altering, or irreversibly changing tool body 20. FIG. 7C shows backset gauge 30 in an extended position, extending forward of tab 24.

FIGS. 7D & 7E are cross-sectional views generally along line 7D-7D of FIG. 7C. FIG. 7D shows backset gauge 30 in the position of FIG. 7C, while FIG. 7E shows backset gauge 30 in a retracted position, where front gauge face 302 of backset gauge 30 is flush with front tab surface 242 of tab 24. (Extensible portion 22 is removed from FIG. 7E for clarity.)

In the shown embodiment, as can also be seen in FIG. 6A, backset gauge 30 is positionable by loosening screw 36, slidably extending backset gauge 30 by a desired offset distance, and tightening screw 36 in a retainer 70 to lock backset gauge 30 into position. Retainer 70 may, for example, be a square nut positionable in a retainer groove 72 of backset gauge 30. Other configurations for locking backset gauge 30 into position will be apparent to those having skill in the art.

In use, rear tab surface 244 of thin tab 24 is placed against a material. Extensible portion 22 is slid forward from tool body 20 to the desired measurement distance. The measurement may be read using first set of measuring indicia 62. Tab 24 is thin relative to the tolerance of the job; for example, tab 24 may have a thickness on the order of a saw blade, e.g. 1/16". The user may compensate for the thickness of tab 24 when reading the measurement, in much the same manner as when making a measurement compensation for saw kerf.

To transfer a measurement to a material to be marked or cut, the user may place front tab surface 242 against an edge of the material. A writing utensil may be placed against front end 222 and slid, along with the ruler, along the material edge to mark a squared line at the measured distance. In some embodiments, extensible portion 22 may have a recess 34 over a portion of front end 222. Recess 34 is configured so that the tip of a writing instrument may be placed within the recess, which then acts as a guide when sliding the ruler for marking. Recess 34 is especially useful for drawing squared lines at preset distances.

Embodiments of the ruler may include a lock 26 which is positionable along the length of extensible portion 22, such as by sliding on a guide, and is used to fix the extension distance of extensible portion 22. A slidably positionable embodiment of lock 26 may be seen in FIG. 7E. In this embodiment, longitudinal channel 52 has two sidewalls 56 (one shown in FIG. 7E, the other indicated in FIG. 6A). Each sidewall 56 has a groove 58 which is angled downwardly toward front body face 202. Grooves 58 are preferably symmetric about the longitudinal axis (A) of channel 52.

Lock 26 has a bottom lock face 28, which is configured to contact extensible portion 22 and hold extensible portion 22 in a desired extension position. Lock 26 also has two feet 29 (see also FIG. 6A) which are each slidably positionable within one of grooves 58. Feet 29 are configured to slide downwardly within grooves 58, thereby bringing bottom lock face 28 into contact with extensible portion 22. As lock 26 is slid forward along grooves 58, the clearance between bottom lock face 28 and extensible portion 22 is reduced and increasing pressure is applied on extensible portion 22, thereby preventing it from sliding within channel 52 and locking its position. Similarly, as lock 26 is slid rearwardly along grooves 58, clearance between bottom lock face 28 and extensible portion 22 is increased thereby reducing pressure on extensible portion 22 and permitting movement thereof. Bottom lock face 28 may be inclined forwardly to evenly distribute pressure over the bottom lock face as the lock travels within grooves 58.

In some embodiments, the measuring tool includes a second set of measuring indicia 64 (see FIG. 1), which are longitudinally spaced over tool body 20 with rear body face 204 being their zero point. Second set of measuring indicia 64 may continue onto extensible portion 22, with any numerical markings increasing as the extensible portion is slid forwardly from the tool body. A cumulative measured distance (tool body length+extended length of portion 22) may be read at front body face 202.

Any of the aforementioned measuring indicia 62, 64, or 66 may be marked on a label, engraved, embossed, debossed or the like. They may include evenly spaced tick marks of differing length, may include numbers representing a measuring distance, and may correspond to measurements in any units such as inches, feet, millimeters, centimeters, meters, or the like.

In some embodiments, an label 44 provides an erasable writing surface that allows a user to mark and erase custom measurements as a job progresses. The embodiment of FIG. 6A shows five labels 44: two on ruler tool body 20, two on extensible portion 22, and one on backset gauge 30. Labels 44 may preferably be formed of a material which permits repeated erasure without significant surface damage, for example polyester with a matte finish. Erasable label 44 may be preprinted on the back side with any of measuring indicia 62, 64, or 66, or with other scale lines. Label 44 may also be custom printed for any application.

Referring again to FIGS. 7A & 7B, tool body 20 of the shown embodiment includes a compartment 42 which is shaped and dimensioned to receive a writing instrument 500, such as a pencil. Compartment 42 is accessible when extensible portion 22 is extended, as shown in FIG. 7A. Compartment 42 is covered when extensible portion 22 is fully collapsed inside tool body 20, as in FIG. 7B. The ruler may also include a pencil sharpener 46, as shown in FIG. 7C and the exploded view of FIG. 6A.

FIG. 8 is an enlarged view of region 8 of FIG. 6B. FIG. 8 best shows recess 34 of extensible portion 22, used for guiding a writing instrument when marking. As shown, extensible portion 22 may also have a grooved or knurled surface on its longitudinal edges 228. This grooved surface reduces slipping of a writing instrument which may be held against longitudinal edge 228 when marking (discussed further below in some methods of use).

Other embodiments of the measuring tool may include one or a combination of the following features: a grip 32 (see FIG. 2) which may extend along a portion of the bottom of tool body 22, may be narrower than tool body 22, and may have a knurled surface; a clip 38 (see FIGS. 2 & 6A) for attachment to a pocket, belt, or the like; and an aperture 40 (see FIG. 2) suitable for hanging the tool. The measuring tool may be constructed of durable plastic for easy cleanup and to prevent shock hazards when used near electrical outlets.

Figure 9:
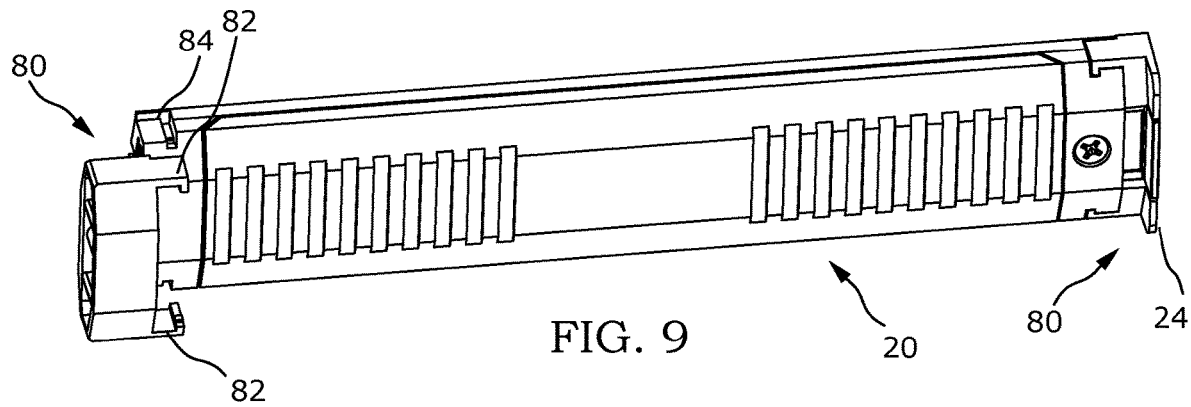
FIG. 9 is a reduced rear perspective view of the tool.
Figure 11A:
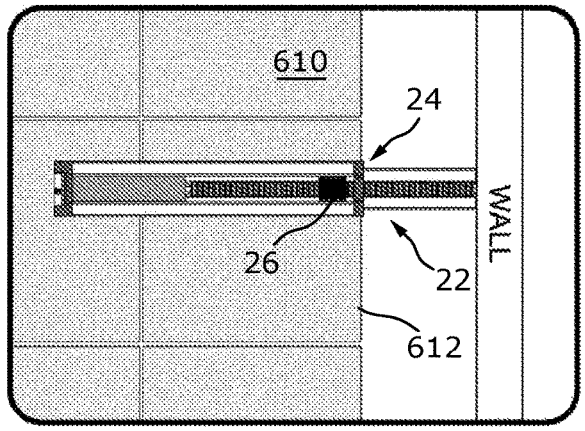
FIGS. 11A & 11B are views of the tool in use used for basic measuring and marking, respectively.
Figure 11B:
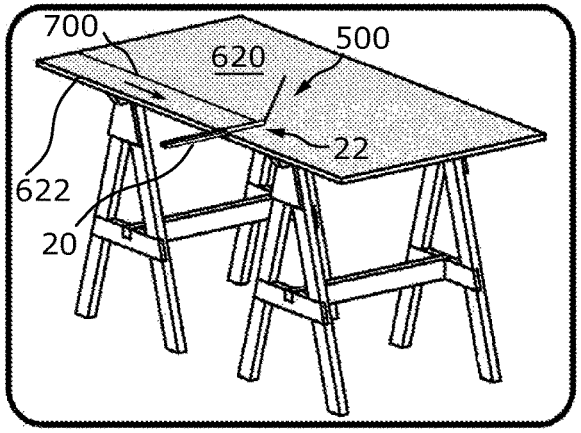

FIG. 9 is a reduced rear perspective view of the measuring tool, with an end piece 80 removed to illustrate coupling detail. In the shown embodiment, end pieces 80 each have two u-shaped clasps 82 configured to be received by complementary shaped notches 84 in tool body 20. This configuration allows end pieces 80 to be easily removed and interchanged, for example with an end piece 80 having a tab 24 or with an end piece 80 having a pencil sharpener or belt clip. The embodiment of FIG. 6A includes two end pieces 80, the front end piece including tab 24, and the rear end piece including a clip 38 and pencil sharpener 46. In another embodiment, an end piece 80 may have four of clasp 82, two on each opposing end of the end piece. This type of end piece may be used to join two of tool body 20 end to end.

FIG. 10 is a top plan view of an embodiment of extensible portion 22. The shown embodiment of extensible portion 22 is removable from the tool body by sliding forward through the open end of the tool body's channel. An adjustable angle attachment 90 is connectable to the front or rear end 222, 224 of extensible portion 22. Angle attachment 90 includes two arms 92 which may be continuously rotated about a central pivot point 94 of the attachment. Arms 92 are shown in alternate positions as indicated by the dashed lines of FIG. 10.

A screw, bolt, rod, or pin may be located at pivot point 94 with each arm 92 including a hole for connection to the pivot point. A wing nut, thumbscrew, or similar device may be used to lock or release the position of arms 92. Each arm 92 may include a substantially flat face 96 for flush placement against a material surface. Use of the adjustable angle attachment is discussed below with reference to FIGS. 17A-D.

Figure 18A:
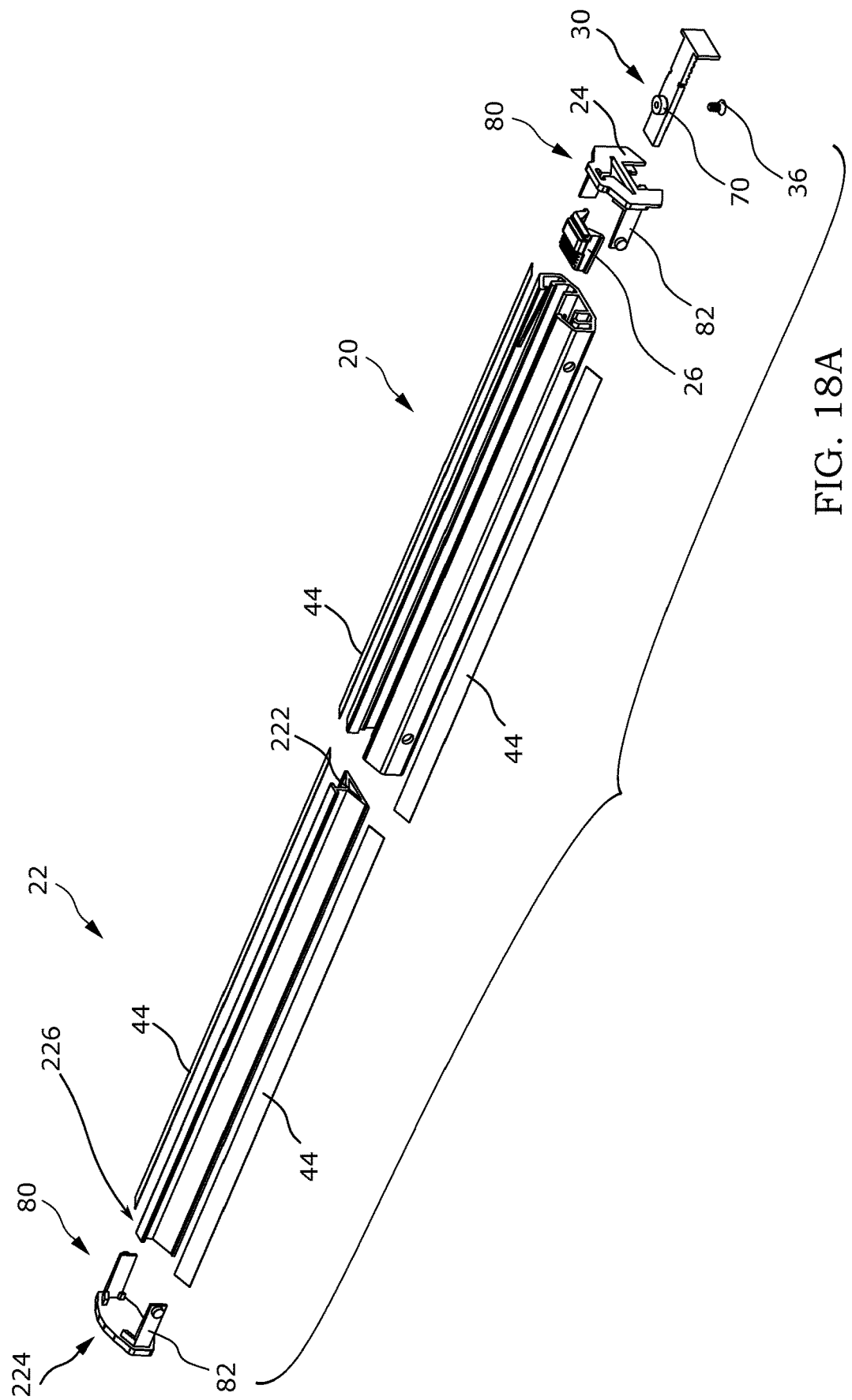
FIG. 18A is a reduced exploded perspective view of another embodiment of the tool; and, FIGS. 18B-18D are reduced perspective views of embodiments of the tool.

FIG. 18A is a reduced exploded perspective view of another embodiment of the adjustable measuring tool, and FIG. 18B is an assembled view of the same embodiment. The shown embodiment is better suited for production by extrusion, whereas other embodiments are suitable for production by injection molding. In the shown embodiments, end pieces 80 have clasps 82 with a small protuberance or button on each end, configured to snap into tool body 20. Backset gauge 30 includes an integral retainer 70, with which screw 36 engages to lock the position of the backset gauge. Lock 26 and labels 44 are included as discussed above for other embodiments.

FIGS. 18C & 18D are reduced perspective views of other embodiments of the tool. The embodiment of FIG. 18C includes a caliper attachment 86. Caliper attachment 86 may have components which connect to either one or both of front body face 202 of the tool body or front end 222 of the extensible portion. In use, extensible portion 22 may be slid forwardly to open caliper attachment 86. In the embodiment of FIG. 18D, adjustable angle attachment 90 is connected to the front end 222 of extensible portion 22, as described in discussion of FIG. 10 above. Caliper attachment 86 or angle attachment 90 may be easily removable by snap-fitting or slidable engagement, or may be an integral feature of an interchangeable end piece 80.

FIGS. 11-17 show the adjustable measuring tool in varies positions of use for measuring and marking. Methods of use are described below with reference to these figures. FIGS. 11A & 11B are views of the adjustable measuring tool being used for basic measuring and marking, respectively. A method of measuring a distance from a first material edge 612 of a first material 610, includes (see FIGS. 1-6 & 11A):

(a) providing a measuring tool including:
  (i) an elongated tool body 20 having a longitudinal channel 52 defined therethrough, the channel shaped and dimensioned to receive an extensible portion 22;
  (ii) the channel having an open end 54 coincident with a front body face 202 of the tool body, and the extensible portion slidably positionable within the channel and extensible through the open end;
  (iii) a thin tab 24, extending downwardly from the front body face and having a substantially flat front tab surface 242 and a substantially flat rear tab surface 244; and,
  (iv) the extensible portion having a front end 222, a rear end 224, a top face 226, and a first set of measuring indicia 62 on the top face, the indicia longitudinally spaced and oriented substantially parallel to the front body face, wherein the front end is a zero point for the first set of measuring indicia;
(b) positioning rear tab surface 244 in contact with first material edge 612; and,
(c) sliding extensible portion 22 forwardly through open end 54 to a desired measurement distance.

The above method may further include:
after (c), locking extensible portion 22 in position using a lock 26.

For basic marking, the above method may further include (see FIG. 11B):

providing a writing utensil 500 and a second material 620 having a second material edge 622;
after (c), positioning front tab surface 242 in contact with second material edge 622 so that extensible portion 22 rests against second material 620, and positioning writing utensil 500 adjacent front end 222 of extensible portion 22;
then, while maintaining contact between front tab surface 242 and second material edge 622, sliding the measuring tool and writing utensil 500 together (for example along the directional arrow of FIG. 11B) to mark a line 700 on second material 620 at the desired measurement distance.

In embodiments of the above method, writing utensil 500 may be inserted into recess 34 of extensible portion 22 (see FIGS. 1 & 2).

Figure 12A:
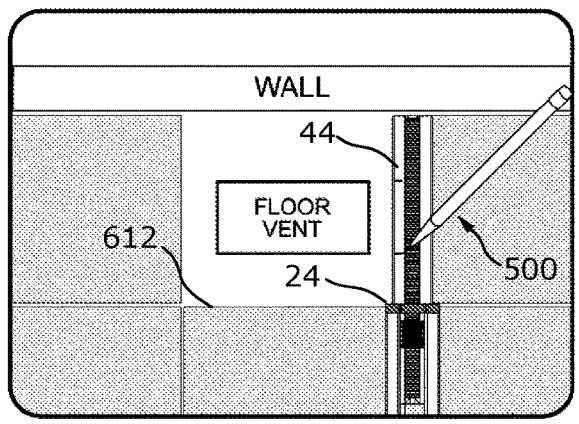
FIGS. 12A & 12B are views of the tool in use for multiple measuring and marking, respectively.
Figure 12B:
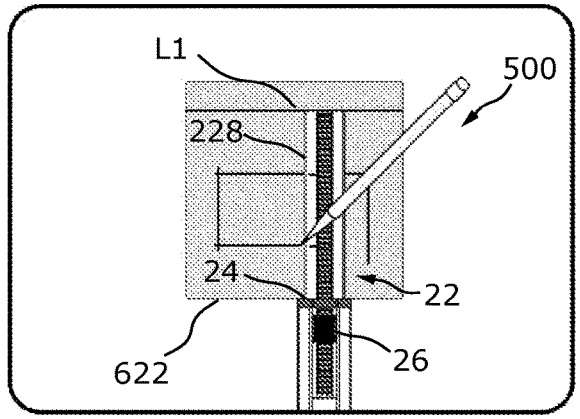

FIGS. 12A & 12B are views of the adjustable measuring tool being used for multiple measuring and marking, respectively.

The method for taking multiple measurements includes (see FIG. 12A):
- a) Place rear tab surface 244 of measuring tab 24 against a first material edge 612 to be the starting point of a measurement.
- b) Slide extensible portion 22 out to the longest distance to be measured.
- c) Optionally, lock extensible portion 22 in place using lock 26.
- d) Using writing utensil 500, mark a line on template label 44 for each adjacent parallel measurement.
- e) Mark a line at the measuring tab 24 location to record the extensible portion 22 extension distance for the first measured side.
- f) Repeat steps (a)-(e) to record measurements for the second side.

The method for marking multiple measurements includes (see FIG. 12B):
- a) Slide extensible portion 22 out to the extension distance line marked on template label 44 for the first side.
- b) Optionally, lock extensible portion 22 in place using lock 26.
- c) Place front tab surface 242 of measuring tab 24 against a second material edge 622 to be marked.
- d) Positioning a writing utensil 500 adjacent front end 222 of extensible portion 22 to mark the first dimension at the tip of extensible portion 22. Optionally, insert writing utensil 500 into recess 34 (see FIGS. 1 & 2).
- e) Slide writing utensil 500 and the measuring tool together along second material edge 622 to mark a squared line L1.
- f) Mark any additional lines parallel to L1 by holding writing utensil 500 against an edge 228 of extensible portion 22 where the respective line was marked on template label 44 for the first side.
- g) Repeat steps (a)-(f) to mark the measurements for the second side.

Figure 13B:
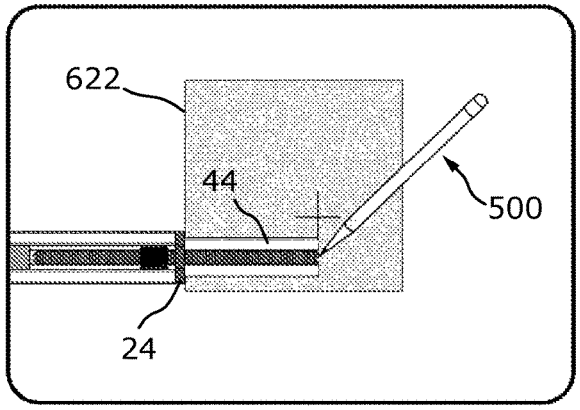

FIGS. 13A & 13B are views of the adjustable measuring tool in use for measuring and marking centers, respectively. The method for measuring centers includes (see FIG. 13A):
- a) Place rear tab surface 244 measuring tab 24 against a first material edge 612 to be the starting point of a measurement.
- b) Slide extensible portion 22 out until front end 222 is aligned with the center of the object 800 being measured.
- c) Optionally, lock extensible portion 22 in place using lock 26.
- d) Mark a line on template label 44 at the measuring tab 24 location to record the extensible portion 22 extension distance for the first measurement.
- e) Repeat steps (a)-(d) to the second measurement (to measure both vertical and horizontal centers).

The method for marking centers includes (see FIG. 13B):
- a) Place the front tab surface 242 of measuring tab 24 against second material edge 622 to be marked.
- b) Extend extensible portion 22 to the distance marked for the vertical center.
- c) Optionally, lock extensible portion 22 in place using lock 26.
- d) Positioning writing utensil 500 adjacent front end 222 of extensible portion 22 or, insert writing utensil 500 into recess 34 (see FIGS. 1 & 2).
- e) Slide writing utensil 500 and the measurement tool together along second material edge 622 to mark a vertical center line.
- f) Repeat steps (a)-(e) to mark the horizontal center line, wherein extension distance of (b) is as marked for horizontal center rather than for the vertical center.

Figure 14A:
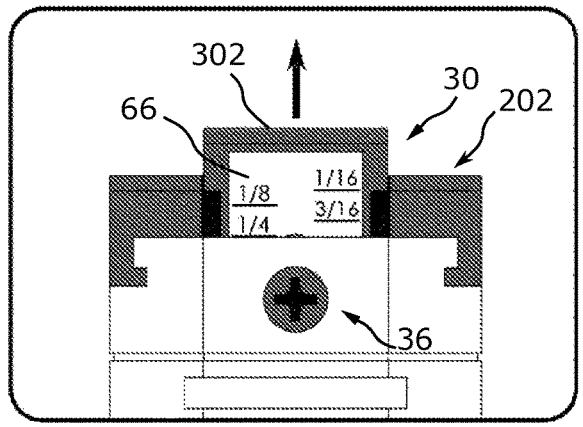
FIGS. 14A, 14B, & 14C are views of the tool in use for backset gauge setup and backset measuring and marking, respectively.
Figure 14B:
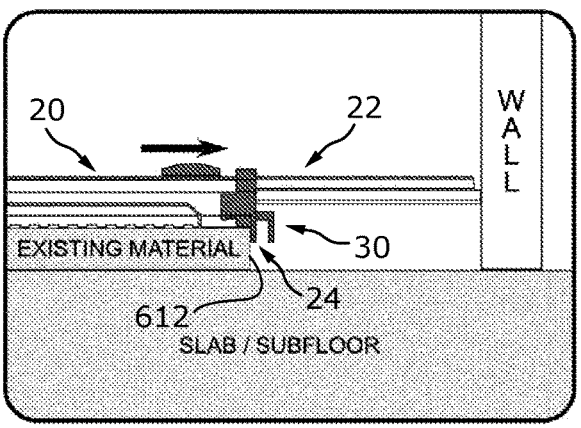
Figure 14C:
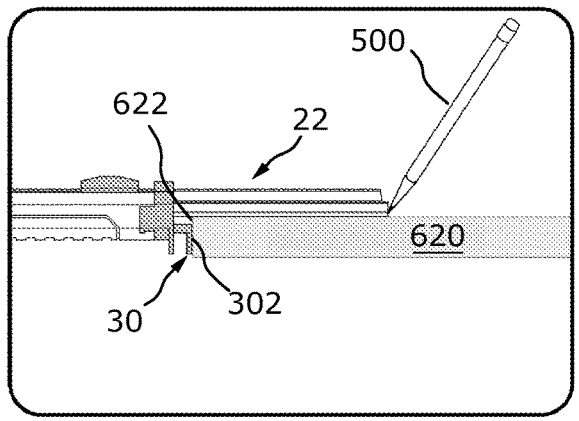

FIGS. 14A, 14B, & 14C are views of the adjustable measuring tool being used for backset gauge setup and backset measuring and marking, respectively.

A method of backset gauge setup includes (see FIG. 14A):
- a) Loosen backset gauge set screw 36 located at the rear of the tool.
- b) Slide backset gauge 30 out to the required backset distance.
- c) Tighten set screw 36 to hold backset gauge 30 in the desired position.

A method of measuring a distance from a first material edge 612 and marking a second material 620 with a backset distance, includes (see FIGS. 1-6 & 14A-C):
- (a) providing a measuring tool including:
  - (i) an elongated tool body 20 having a longitudinal channel 52 defined therethrough, the channel shaped and dimensioned to receive an extensible portion 22;
  - (ii) the channel having an open end 54 coincident with a front body face 202 of the tool body, and the extensible portion slidably positionable within the channel and extensible through the open end;
  - (iii) a thin tab 24, extending downwardly from the front body face and having a substantially flat front tab surface 242 and a substantially flat rear tab surface 244;
  - (iv) the extensible portion having a front end 222, a rear end 224, a top face 226, and a first set of measuring indicia 62 on the top face, the indicia longitudinally spaced and oriented substantially parallel to the front body face, wherein the front end is a zero point for the first set of measuring indicia; and,
  - (v) a backset gauge 30 forwardly extensible from the tool body, the backset gauge having a substantially flat front gauge face 302 configured to not extend forward of front body face 202 when the backset gauge is in a recessed position;
- (b) extending backset gauge 30 forwardly from tool body 20 by a desired backset distance;
- (c) positioning rear tab surface 244 of tab 24 in contact with first material edge 612; (d) sliding extensible portion 22 forwardly through open end 54 to a desired measurement distance;
- (e) providing a writing utensil 500;
- (f) positioning front gauge face 302 in contact with a second material edge 622 of second material 620 so that the extensible portion rests against second material 620, and positioning the writing utensil adjacent front end 222 of the extensible portion; and,
- (g) then, while maintaining contact between front gauge face 302 and edge 622 of the second material, sliding the measuring tool and the writing utensil together to mark a line on the second material at the desired measurement distance.

Figure 15A:
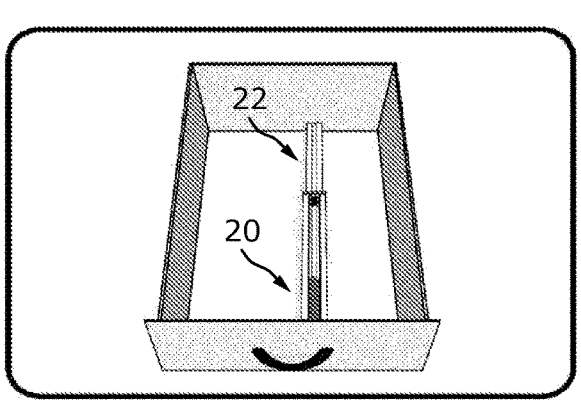
FIGS. 15A & 15B are views of the tool in use for inside measuring and marking, respectively.
Figure 15B:
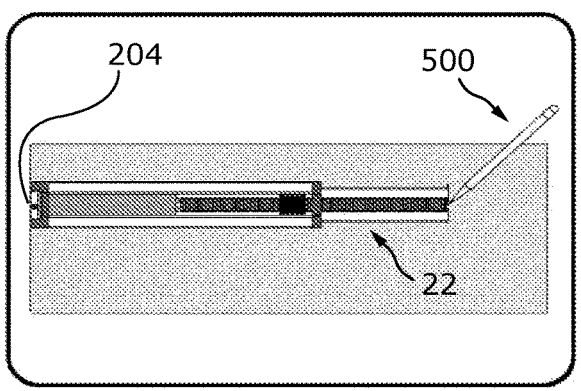

FIGS. 15A & 15B are views of the adjustable measuring tool being used for inside measuring and marking, respectively. The method for inside measuring includes (see FIG. 15A):
- a) Place the ruler inside the space to be measured.

b) Slide extensible portion 22 out to the distance to be measured.

c) Optionally, lock extensible portion 22 in place using lock 26.

The method for inside marking includes (see FIG. 15B):

a) Set rear body face 204 of the ruler against the edge of material to be marked.

b) Mark a line at the tip of extensible portion 22.

c) Draw a squared line for cutting along tool body 20 or extensible portion 22.

Figure 16:
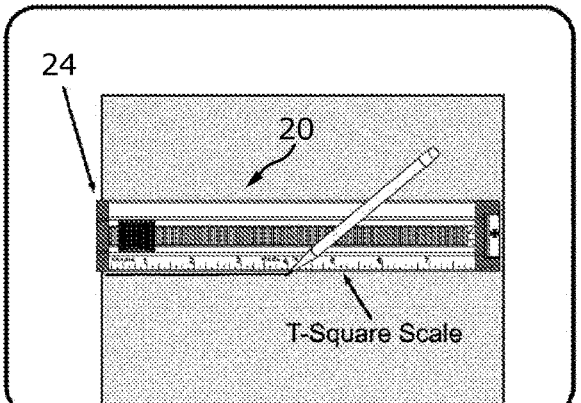
FIG. 16 is a view of the tool in use as a T-square.

FIG. 16 is view of the adjustable measuring tool in use as a T-square. The measuring tab 24 on the tool body 20 allows a user to use the adjustable measuring tool as a T-Square for drawing squared lines on a note pad as well as squaring lines on material for cutting.

Figure 17A:
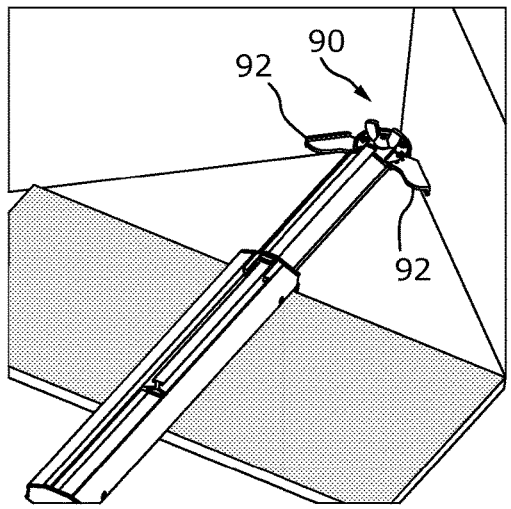
FIGS. 17A-17D are views of the adjustable measuring tool with an adjustable angle attachment in use for measuring and marking angles.
Figure 17B:
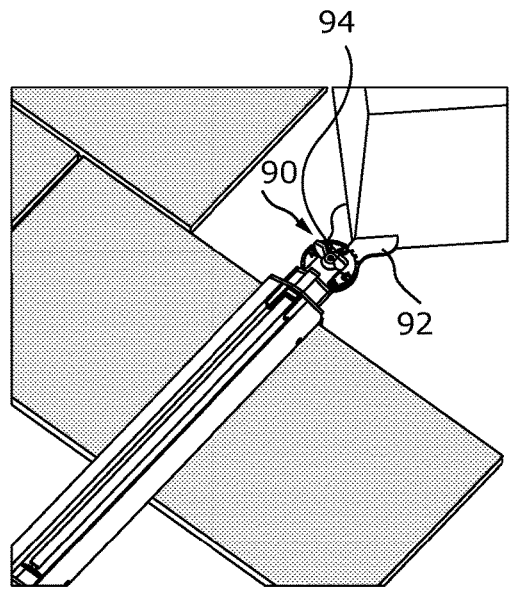

FIGS. 17A-17D are views of the adjustable measuring tool with adjustable angle attachment 90 being used for measuring and marking angles. FIGS. 17A and 17B show adjustable angle attachment 90 with arms 92 aligned to internal and external corners, respectively. Arms 92 are rotated about pivot point 94 until the substantially flat face 96 of each arm 92 is in contact with a surface which forms part of the angle to be measured. A wing nut or the like may be used to lock the position of arms 92. The measured angle may then be transferred to a material for cutting by placing the tool against the material and marking a line along each flat face 96.

As also shown in FIGS. 17A & 17B, an offset distance from existing material, such as a floor tile (shown here in gray), may be measured at the same time as making the angle measurement. An offset, such as for a grout joint, may be subtracted at the same time using backset gauge 30.

Figure 17C:
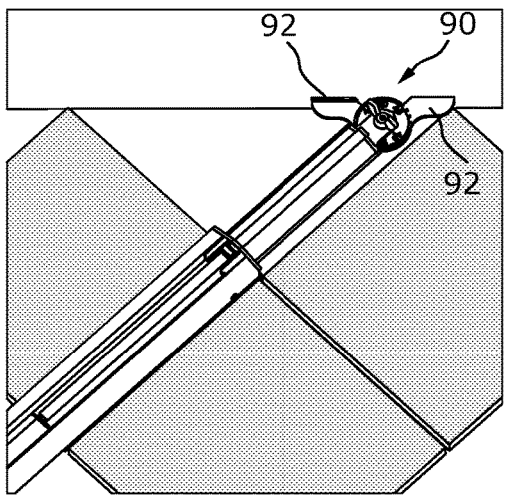
Figure 17D:
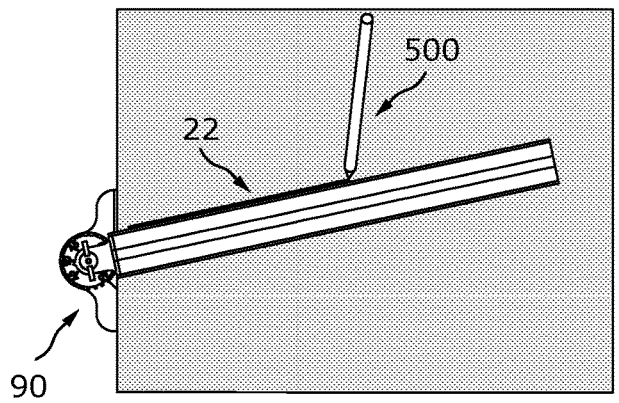

In FIG. 17C, arms 92 are positioned about 180 degrees apart, but are angled with respect to tool body 20. The angle of arms 92 may be read from an angle measuring indicia on the attachment (see for example FIG. 10). FIG. 17D shows extensible portion 22 removed from tool body 20. Adjustable angle attachment 90 and extensible portion 22 provide an adjustable square, which may be used to draw straight lines at various angles on a drawing board or any material for layouts. Further provided is a measuring tool including extensible portion 22 and angle attachment 90, without tool body 20.

A method for measuring an angled material includes (see FIGS. 17A-C):

a) Provide an adjustable angle attachment 90 as described herein.

b) Rotate arms 92 about pivot point 94 to position the arms against a surface to be measured or measured away from.

c) Optionally, lock the position of arms 94.

The method for transferring angle measurements includes (see FIG. 17D):

a) On material to be marked draw squared lines against face 96 of arms 92, or b) Align face 96 of arms 92 against material to be marked, and draw a line along longitudinal edge 228 of extensible portion 22 or tool body 20.

Further provided is a system, wherein the adjustable measuring tool is packaged with any of: replacement labels 44 which may be erasable, pre-printed, or blank; an angle attachment 90; a caliper attachment 86; end pieces 80 having various features discussed herein; a writing utensil; a belt clip; a lanyard; a pencil sharpener; or an instruction manual. The tool described herein may be packaged or sold as individual parts requiring assembly prior to use.

The embodiments of the adjustable measuring tool and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the tool and method should be construed as limiting the invention to a particular embodiment or combination of embodiments. The scope of the invention is defined by the appended claims.

I claim:

1. A measuring tool, comprising:
    an elongated tool body having a longitudinal channel defined therethrough, the channel shaped and dimensioned to receive an extensible portion;
    the channel having an open end coincident with a front body face of the tool body, the extensible portion slidably positionable within the channel and extensible through the open end;
    a thin tab, extending downwardly from the front body face and having a substantially flat front tab surface and a substantially flat rear tab surface;
    the extensible portion having a front end, a rear end, a top face, and a first set of measuring indicia longitudinally spaced on the top face and oriented substantially parallel to the front body face, wherein the front end is a zero point for the first set of measuring indicia; and
    a backset gauge forwardly extensible from the tool body, adjustably positionable between a recessed position and a fully extended position, and having a substantially flat front gauge face configured to not extend forward of the front body face when the backset gauge is in the recessed position.

2. The measuring tool according to claim 1, wherein:
    the backset gauge is configured to be locked in an extended position.

3. The measuring tool according to claim 1, wherein:
    the backset gauge is extensible forward of the front body face by at least 25 mm.

4. The measuring tool according to claim 1, further including:
    the backset gauge having a set of longitudinally spaced backset measuring indicia oriented substantially parallel to the front body face, wherein the front gauge face is a zero point for the backset measuring indicia.

5. The measuring tool according to claim 1, further including:
    the longitudinal channel having two sidewalls, each sidewall having a groove angled downwardly toward the front body face; and,
    a lock having a bottom lock face and two feet, each foot slidably positionable within one of the grooves, the bottom lock face configured to contact the extensible portion when the feet are slid downwardly within the grooves, thereby restricting motion of the extensible portion within the channel.

6. The measuring tool according to claim 1, further including:
    a second set of measuring indicia longitudinally spaced over the tool body and the extensible portion, the indicia oriented substantially parallel to the front body face, and wherein a rear body face of the tool body is a zero point for the second set of measuring indicia.

7. The measuring tool according to claim 1, further including:

a label having an erasable writing surface, the label extending longitudinally along one of the tool body or the extensible portion.

8. The measuring tool according to claim 1, the measuring tool cooperating with a writing instrument having a tip, the measuring tool further including:
the extensible portion having a recess over a portion of the front end, the recess configured to receive the tip of the writing instrument.

9. The measuring tool according to claim 1, further cooperating with a writing instrument, the measuring tool further including:
the tool body having a compartment shaped and dimensioned to receive the writing instrument.

10. The measuring tool according to claim 1, further including:
the extensible portion having longitudinal edges, wherein the longitudinal edges have a grooved surface.

11. The measuring tool according to claim 1, further including:
an adjustable angle attachment configured for connection to the front end of the extensible portion, the adjustable angle attachment having two arms continuously rotatable about a central pivot point, each arm having a substantially flat face.

12. The measuring tool according to claim 1, the tool cooperating with a writing instrument having a tip, the tool further including:
the backset gauge being configured to be locked in an extended position;
the backset gauge having a set of longitudinally spaced backset measuring indicia oriented substantially parallel to the front body face, wherein the front gauge face is a zero point for the backset measuring indicia;
a second set of measuring indicia longitudinally spaced over the tool body and the extensible portion, the indicia oriented substantially parallel to the front body face, and wherein a rear body face of the tool body is a zero point for the second set of measuring indicia;
the longitudinal channel having two sidewalls, each sidewall having a groove angled downwardly toward the front body face;
a lock having a bottom lock face and two feet, each foot slidably positionable within one of the grooves, the bottom lock face configured to contact the extensible portion when the feet are slid downwardly within the grooves, thereby restricting motion of the extensible portion within the channel;
a label having an erasable writing surface, the label extending longitudinally along one of the tool body or the extensible portion; and,
an adjustable angle attachment configured for connection to the front end of the extensible portion, the adjustable angle attachment having two arms continuously rotatable about a central pivot point, each arm having a substantially flat face.

13. A measuring tool, comprising:
an elongated tool body having a longitudinal channel defined therethrough, the channel shaped and dimensioned to receive an extensible portion;
the channel having an open end coincident with a front body face of the tool body, the extensible portion slidably positionable within the channel and extensible through the open end;
a thin tab, extending downwardly from the front body face and having a substantially flat front tab surface and a substantially flat rear tab surface;
the extensible portion having a front end, a rear end, a top face, and a first set of measuring indicia longitudinally spaced on the top face and oriented substantially parallel to the front body face, wherein the front end is a zero point for the first set of measuring indicia; and
a cross-section of the extensible portion adjacent the rear end being larger than the open end of the channel, thereby restricting motion of the extensible portion through the open end.

14. Original A method of measuring a distance from a first material edge and marking a second material with a backset distance, the method comprising:
(a) providing a measuring tool including:
(i) an elongated tool body having a longitudinal channel defined therethrough, the channel shaped and dimensioned to receive an extensible portion;
(ii) the channel having an open end coincident with a front body face of the tool body, and the extensible portion slidably positionable within the channel and extensible through the open end;
(iii) a thin tab, extending downwardly from the front body face and having substantially flat front tab surface and a substantially flat rear tab surface;
(iv) the extensible portion having a front end, a rear end, a top face, and a first set of measuring indicia on the top face, the indicia longitudinally spaced and oriented substantially parallel to the front body face, wherein the front end is a zero point for the first set of measuring indicia; and,
(v) a backset gauge forwardly extensible from the tool body, the backset gauge having a substantially flat front gauge face configured to not extend forward of the front body face when the backset gauge is in a recessed position;
(b) extending the backset gauge forwardly from the tool body by a desired backset distance;
(c) positioning the rear tab surface in contact with the material edge;
(d) sliding the extensible portion forwardly through the open end to a desired measurement distance;
(e) providing a writing utensil;
(f) positioning the front gauge face in contact with an edge of the second material so that the extensible portion rests against the second material, and positioning the writing utensil adjacent the front end of the extensible portion; and,
(g) then, while maintaining contact between the front gauge face and the edge of the second material, sliding the measuring tool and the writing utensil together to mark a line on the second material at the desired measurement distance.

* * * * *